United States Patent [19]

Svoboda et al.

[11] Patent Number: 4,811,271
[45] Date of Patent: Mar. 7, 1989

[54] EXPANDABLE BI-PHASE CONVOLVING ELEMENT

[75] Inventors: Alan C. Svoboda; John W. Locke, both of Tempe; David C. Campbell, Chandler, all of Ariz.

[73] Assignee: Motorola, Inc., Schaumburg, Ill.

[21] Appl. No.: 65,545

[22] Filed: Jun. 24, 1987

[51] Int. Cl.$^4$ ........................................... G06F 15/336
[52] U.S. Cl. .................................................. 364/728.01
[58] Field of Search ........................................ 364/728

[56] References Cited

U.S. PATENT DOCUMENTS

| 4,346,475 | 8/1982 | Alexis | 364/728 |
| 4,347,580 | 8/1982 | Bond | 364/728 |
| 4,750,144 | 6/1988 | Wilcox | 364/728 |

OTHER PUBLICATIONS

Marconi Data Sheet on Bit-Slice Correlator, MA717, Issue A-1, Apr. 1985, C64.
Nussbaumer, "Efficient Implementation of Convolutions and Discrete Transforms Using Polynomial Transforms and Distributed Arithmetic," *IBM Technical Disclosure Bulletin*, vol. 21, #6, pp. 2374-2375, Nov. 1978.

Primary Examiner—Gary V. Harkcom
Assistant Examiner—Dale M. Shaw
Attorney, Agent, or Firm—Frank J. Bogacz

[57] ABSTRACT

A convolving element which processes sixteen 4-bit samples but may be expanded to convolve both a larger number of samples and a larger number of bits per sample. The expansion occurs through interconnections of identical convolving elements. A selective inversion element inverts particular ones of the convolved samples under the control of a previously loaded binary code. The selective inversion element additionally minimizes interconnections and therefore input/output terminals of the convolving element, by permitting carries for each sample convolved to be accumulated rather than to propagate to more significant elements.

10 Claims, 4 Drawing Sheets

| STATE | CI0 | CI1 | SI0 (LSB) | SI1 (MSB) | IO0 | IO1 | IO2 | IO3 | CARRY | DESCRIPTION |
|---|---|---|---|---|---|---|---|---|---|---|
| 91 | 0 | 0 | X | X | 0 | 0 | 0 | 0 | 0 | FORCE TO ZERO |
| 92 | 0 | 1 | X | 0 | II0 | II1 | II2 | II3 | 0 | NON-INVERT, NOT MSB |
| 93 | 0 | 1 | X | 1 | II0 | II1 | II2 | II3 | II3 | NON-INVERT, MSB |
| 94 | 1 | 0 | 0 | 0 | $\overline{II0}$ | $\overline{II1}$ | $\overline{II2}$ | $\overline{II3}$ | 0 | INVERT, NEITHER |
| 95 | 1 | 0 | 0 | 1 | $\overline{II0}$ | $\overline{II1}$ | $\overline{II2}$ | $\overline{II3}$ | $\overline{II3}$ | INVERT, MSB ONLY |
| 96 | 1 | 0 | 1 | 0 | −(II0−II3) | −(II0−II3) | | | CARRY | INVERT, LSB ONLY |
| 97 | 1 | 1 | 1 | 1 | −(II0−II3) | −(II0−II3) | | | IO3/0 | INVERT, BOTH |
| — | 1 | 1 | X | X | --- | --- | --- | --- | --- | NOT USED |

FIG. 4

EXPANDABLE BI-PHASE CONVOLVING ELEMENT

BACKGROUND OF THE INVENTION

The present invention relates generally to convolving circuits, such as those used in radar pulse compression applications. Specifically, the present invention relates to convolving circuits which are suitable for incorporation within an integrated circuit. More specifically, the present invention relates to an architecture of a convolving circuit element which permits expansion while minimizing external connections between convolving elements.

Conventional convolving circuits are known by those skilled in the art to add a signal with portions of itself that are shifted in time. In digital convolvers the signal may be digitized into many digital samples and each of the samples may be encoded using a predetermined number of bits. Accordingly, while the convolving process represents a type of arithmetic addition operation, a large number of bits per sample together with a large number of samples conventionally require implementation of a convolution circuit in a relatively large amount of hardware.

Such convolver circuits may be used, for example, in radar applications which include a pulse compression function. These applications encode a transmitted radar pulse by shifting the phase of the transmitted radar pulse in a defined manner. In binary phase (bi-phase) coding the transmitted radar pulse is divided into a predetermined number of equal duration segments called chips. Each chip of the transmitted radar pulse exhibits one of two phase values. Each of these two phase values represents 180° phase shift relative to the other. A code, such as a well-known Barker code, various Gold codes, or the like, defines the phase coding of the transmitted pulse. A received echo signal also exhibits this phase coding. The received signal may be decoded using the same code in a convolution process so that the received pulse is compressed and reshaped to be more useful for post-convolution processing in a radar device. The pulse compression permits the radar to discriminate between objects located close to each other and to receive the benefits of a short pulse without requiring the instantaneous power which would otherwise be needed.

Conventional digital convolution circuits tend to be expensive, relatively unreliable, and to require a large amount of power and a large volume for their implementation. Although those skilled in the art recognize that digital circuits in general may be implemented within an integrated circuit, significant problems are encountered in defining an architecture for such an integrated circuit that is flexible enough to meet a wide variety of applications and yet is sufficiently small to fit within available integrated circuit area. If the application requires more circuitry than fits within a single integrated circuit, then additional problems arise due to minimizing terminals for interconnections between the various integrated circuits.

SUMMARY OF THE INVENTION

Accordingly, it is an object of the present invention to provide an improved convolving element which is useful in a wide variety of convolving applications.

Another object of the present invention concerns providing an expandable convolving element which may operate as a complete convolving circuit in itself or may operate in conjunction other identical convolving elements to achieve a larger convolution both in terms of the number of samples processed in a convolution operation and the number of bits used to describe each sample.

Yet another object of the present invention concerns providing a convolving element which has an architecture that tends to minimize the number of terminals required by the convolving element and the number of interconnections between convolving elements when the convolving elements are expanded to perform a larger convolution than is achievable by a single convolving element.

The above and other objects and advantages of the present invention are carried out in one form by an apparatus which receives at least a portion of a stream of input data samples and includes a delay element, a selective inversion element and an adder. The delay element receives a first predetermined number of bits from the stream of input data samples. Additionally, the delay element has a second predetermined number of intermediate outputs. The selective inversion elements have the second predetermined number of inputs which couple to respective ones of the intermediate outputs from the delay element. Each of these inputs receive the first predetermined number of bits. The selective inversion element has one output for each of the second predetermined number of inputs of the selective inversion element. Each of these outputs contains the first predetermined number of output data bits plus an output carry bit. Each of these output data bits and output carry bits from each of the second predetermined number of selective inversion element outputs couples to the adder.

BRIEF DESCRIPTION OF THE DRAWINGS

A more complete understanding of the present invention may be derived by reference to the detailed description and claims when considered in connection with the accompanying drawings, wherein like reference numbers indicate similar features throughout the drawings, and:

FIG. 4 shows a table describing the operation of the selective inverter shown in FIG. 3.

DETAILED DESCRIPTION OF THE PREFERRED EMBODIMENT

Figure 1:
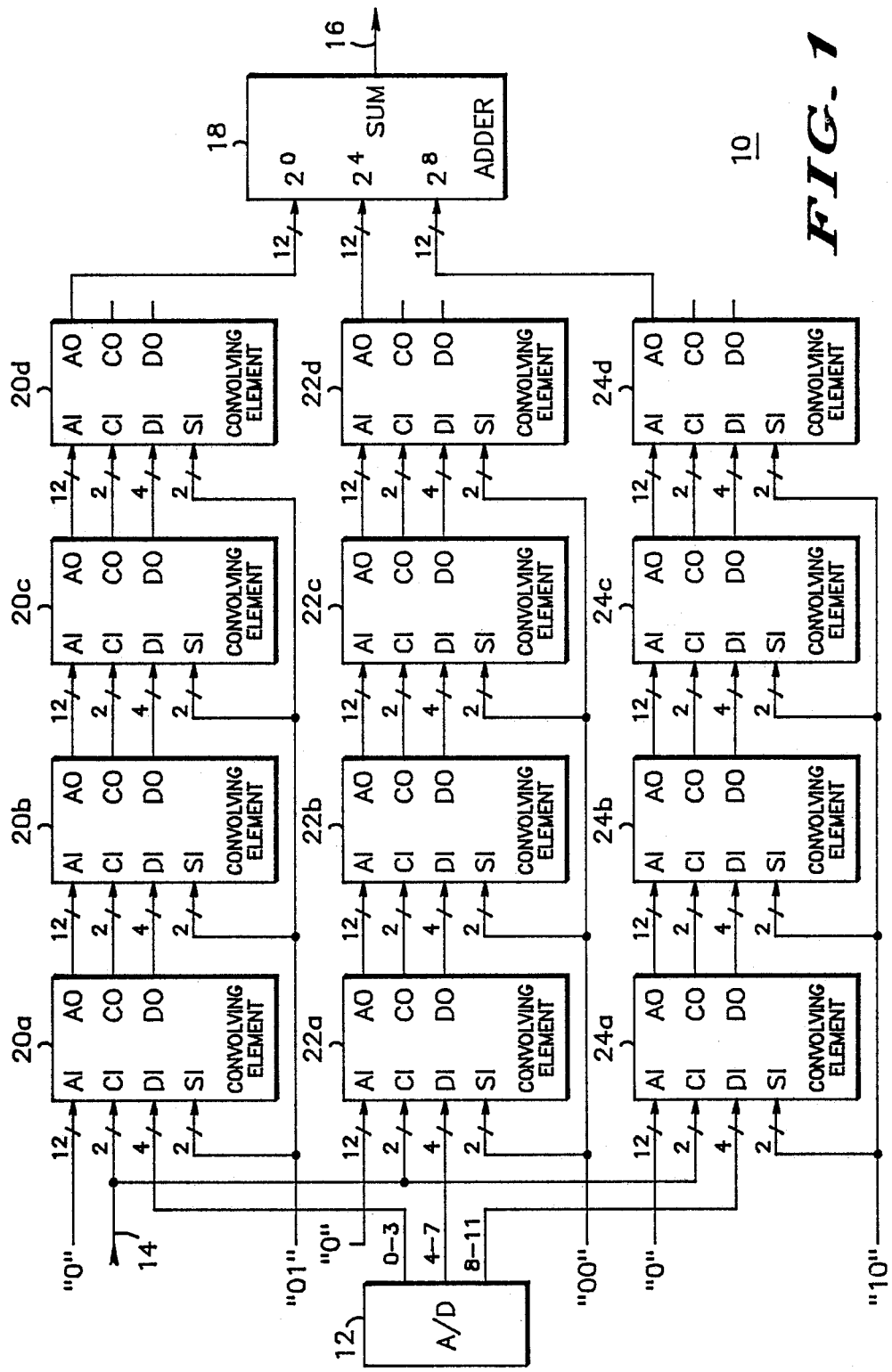
FIG. 1 shows a convolving circuit which utilizes a plurality of identical convolving elements.

FIG. 1 shows a block diagram of a convolving circuit 10. Convolving circuit 10 performs a convolution process on sixty-four 12-bit samples of digital data. Convolution circuit 10 may reside within a receiver of a pulse compression radar (not shown) immediately after a received radar signal has been converted to baseband. Additionally, convolution circuit 10 might reside in only an in-phase channel of such a receiver while a quadrature channel of such a receiver would contain a substantially identical convolving circuit 10.

An input to convolving circuit 10 is provided through analog-to-digital (A/D) converter 12. This input represents a stream of input data samples. The stream of samples represents a continuous sequence of data wherein each sample is independent from previous data samples and new samples occur at a constant predetermined rate. This stream of input data samples represents a 12-bit data stream in this preferred embodiment, as illustrated in FIG. 1. In other words, each sample of data is encoded into 12 digital bits of information, and each bit of information exhibits either a logical zero or a logical one state.

The 12 bits of information which describe the input data stream are divided into three 4-bit, or nibble, portions. A least significant nibble (LSN) consists of bits 0 through 3 where bit 0 represents the least significant bit (LSB) of the 12 bits of data presented in the stream of input data samples. Bits 4 through 7 represent an intermediate significant nibble (ISN). Neither the least significant bit nor a most significant bit of the input data samples are included in the ISN. The most significant nibble (MSN) includes bits 8 through from A/D converter 12. The MSN contains bit 11 which represents the most significant bit (MSB) of the input data samples in this preferred embodiment.

Convolving elements 20a, 20b, 20c and 20d process the LSN portion of the stream of input data samples. Likewise, convolving elements 22a, 22b, 22c and 22d process the ISN portion of the stream of input data samples and convolving elements 24a, 24b, 24c and 24d process the MSN portion of the stream of input data samples. Bits 0 through 3 of the input data stream output from A/D converter 12 couple to a data in (DI) input of convolving element 20a, bits 4 through 7 output from A/D converter 12 couple to a DI input of convolving element 22a, and bits 8 through 11 output from A/D converter 12 couple to a DI input of convolving element 24a.

A terminal 14 receives a code which is used to decode binary phase (bi-phase) coded received signals. Thus, terminal 14 couples to a code in (CI) input of convolving elements 20a, 22a and 24a. In pulse compression radar applications, this code represents the code with which the transmitted radar pulse was encoded as it was being transmitted. Accordingly, this code may be shifted into convolving circuit 10 at terminal 14 simultaneously with the transmission of a transmitted radar pulse. Such shifting of this code into convolving circuit 10 may be accomplished using a clock signal, which is not shown in the FIG. 1 block diagram. Once this code has been loaded into convolving circuit 10, it remains static (does not change) until after a reflected radar pulse has been received and processed in convolving circuit 10, or a corresponding equivalent interval of time has passed.

Each of convolving elements 20, 22 and 24 are identical to the other of convolving elements 20, 22 and 24. Convolving elements 20 are connected together in a cascaded, or series, arrangement to process the LSN of the stream of input data samples. Likewise, convolving elements 22 are connected together in a cascaded arrangement to process the ISN of the stream of input data samples, and convolving elements 24 connected together in a cascaded arrangement to process the MSN of the stream of input data samples. For each of convolving elements 20, 22 and 24 an addition in (AI) input of each of the "a" elements connects to a logical zero so that a digital value equivalent to a 0 is supplied thereto. However, adder out (AO) outputs of each of the "a" elements couples to AI inputs of respective "b" elements, AO outputs of the "b" elements couple to AI inputs of respective "c" elements, and AO outputs of the "c" elements couple to AI inputs of respective "d" elements.

As discussed above, the CI inputs of all "a" elements couple to terminal 14. Additionally, control out (CO) outputs from the "a" elements couple to CI inputs of respective "b" elements, CO outputs of the "b" elements couple to CI inputs of respective "c" elements, and CO outputs of "c" elements couple to CI inputs of respective "d" elements.

Data out (DO) outputs of the "a" elements couple to DI inputs of respective "b" elements, DO outputs of the "b" elements couple to DI inputs of respective "c" elements, and DO outputs of the "c" elements couple to DI inputs of respective "d" elements. AO outputs from the "d" elements couple to an adder 18 while CO and DO outputs from the "d" elements remain unconnected.

Significance in (SI) inputs of each of convolving elements 20 couple to static logic levels which provide a code that informs convolving elements 20 that they are processing the LSB of the stream of input data samples and are not processing the MSB of the stream of input data samples. Such a code is represented by a logical 0,1 (discussed below) in the preferred embodiment. SI inputs of each of convolving elements 22 couple to static logic levels which indicate that convolving elements 22 process neither the MSB nor the LSB of the stream of input data samples. In the preferred embodiment a 0,0 represents such a code. Likewise, SI inputs of each of convolving elements 24 couple to static logic levels which indicate that convolving elements 24 process the MSB from the stream of input data samples but not the LSB. In the preferred embodiment a 1,0 represents such a code.

Adder 18 performs a scaling operation and an addition operation on the data output from the AO outputs of convolving elements "d". In the scaling operation, the output from convolving elements 22 is effectively multiplied by a factor of 16 ($2^4$) before being added with the output from convolving elements 20. Similarly, the AO output from convolving elements 24 is effectively multiplied by a factor of 256 ($2^8$) before being added with the outputs from convolving elements 20 and 22. The output from adder 18 represents the sum of this scaling and addition operation. As recognized by those skilled in the art, the scaling operation may be accomplished through appropriate connections of the AO outputs to adder 18. Output 16 from adder 18 represents the output from convolving circuit 10. It provides a digital value that changes at a rate defined by the rate in which the input data stream is shifted into convolving circuit 10.

Figure 2:
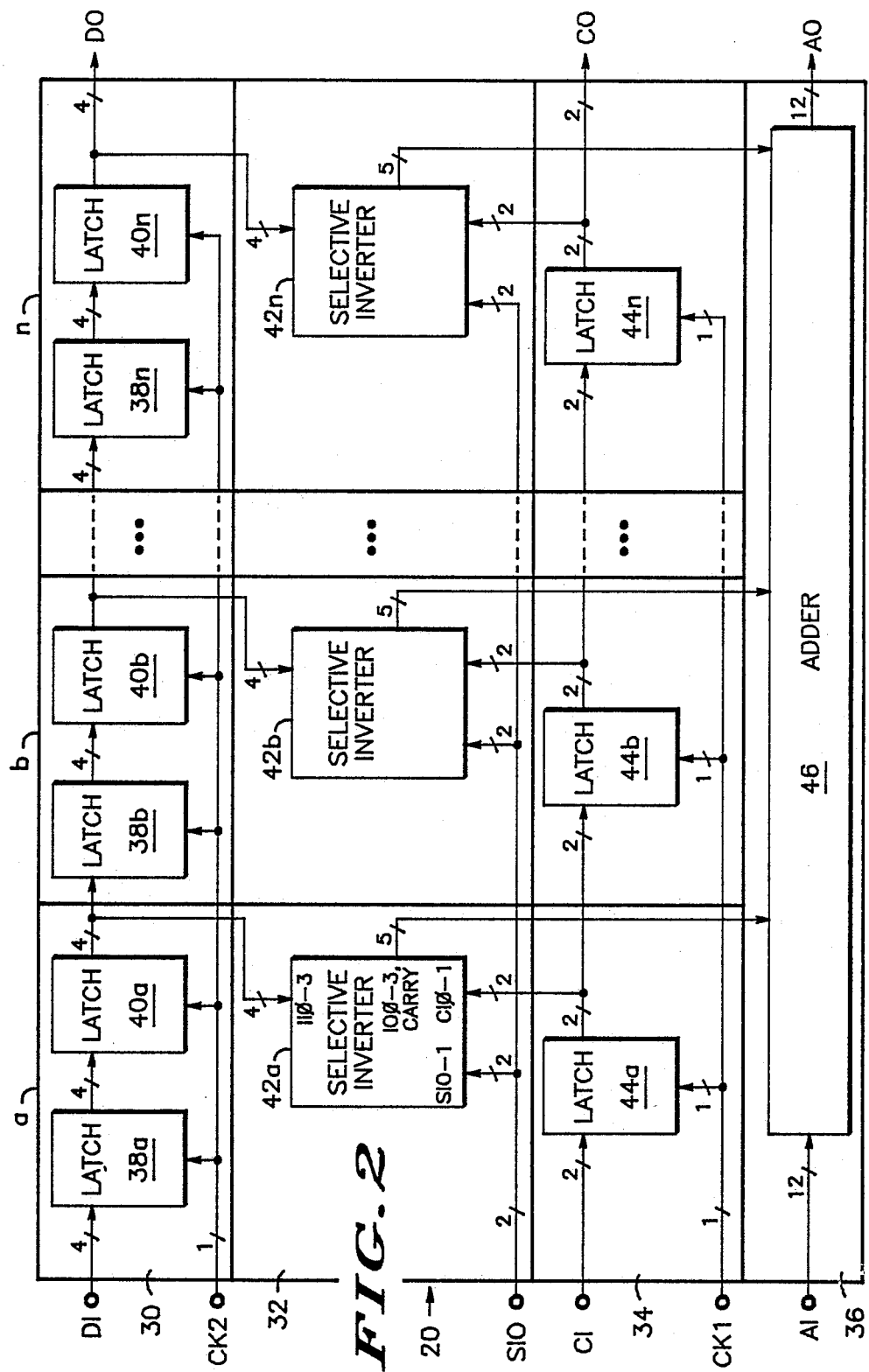
FIG. 2 shows a block diagram of a single convolving element.

Each of convolving elements 20, 22 and 24 and "a", "b", "c" and "d" are identical to the other ones of these convolving elements. FIG. 2 shows a block diagram of a single one of these convolving elements which is labeled convolving element 20 in FIG. 2.

Thus, reference to convolving element 20 addresses convolving elements 22 and 24 as well. Convolving element 20 may be viewed as having a delay element 30, a selective inversion element 32, an inversion control element 34 and a summing element 36. Additionally, each of delay element 30, selective inversion element 32, and inversion control element 34 may be viewed as containing a plurality of cells labeled "a", "b", and so on through "n". The preferred embodiment contains 16 cells. Thus, referring back to FIG. 1, the cascading of four convolving elements 20 allows a convolution process of a total of sixty-four samples from the stream of input data samples.

In general, convolving element 20 adds samples of a signal to other samples of the same signal which have been shifted in time. The convolution operation adds a predetermined number of successive samples together to produce a final sum which represents the convolution. As a new sample becomes available in the stream of input data samples, the convolution process repeats using a new set of data. Specifically, the new set of data differs from the old set of data in that the earliest one of the predetermined number of samples is no longer included in the convolution but is replaced by the latest sample in the convolution operation.

In convolving element 20 any one or more of the samples over which the convolution operation occurs may be inverted depending upon a code which has been previously loaded within convolving element 20. The inversion of any one particular sample is independent from the inversion of other samples. In other words, some of the samples are selected for inversion while other samples are not selected for inversion. As known to those skilled in the art, such selective inversion in radar pulse compression applications decodes a binary phase (bi-phase) encoded radar pulse so that a maximum level convolved signal occurs when a received radar pulse becomes properly aligned with the convolver and code loaded therein. Additionally, such codes are typically chosen to minimize side lobes which occur when such a radar pulse is not properly aligned.

In the preferred embodiment, delay element 30 contains a latch 38 and a latch 40 for each cell of delay element 30. Thus, a latch 38a has a data input which couples to the DI input of convolving element 20 and a data output which couples to a data input of a latch 40a. A data output of latch 40a represents an output from the "a" cell. In a similar cascading manner a data input to latch 38b couples to this output of latch 40a and a data input of latch 40b couples to a data output from latch 38b. This cascaded connection continues until the final cell, cell n, where the data output from latch 40n couples to the DO output of convolving element 20.

In the preferred embodiment, a CK2 clock signal applied to convolving element 20 couples to clock inputs of each of latches 38 and 40. Additionally, each of latches 38 and 40 receives and supplies 4 bits of data in parallel from a previous stage of delay element 30, except for latch 38a which receives 4 bits in parallel from the DI input of convolving input 20. Thus, delay element 20 may be used to process any 4-bit portion of an input data stream, such as the 12-bit data stream described above in connection with FIG. 1.

Delay element 30 includes two latches for each cell. This permits over sampling of the input data stream and reduces range cusping in radar pulse compression applications. Thus, input data stream samples may be clocked into delay element 30 of convolving element 20 at rate which is twice the rate of the bi-phase coding of a transmitted radar pulse.

Each of cells a through n for delay element 30 provides an output which represents an intermediate output of delay element 30. In the preferred embodiment, these outputs are provided by latches 40 only. The intermediate outputs provide the same portion of the stream of input data samples which have been shifted into convolving element 20 at the DI input. However, at any given point in time, each of the intermediate outputs provide a sample which occurred at a different point in time from the occurrence of the other samples. In other words, delay element 30 operates in a manner similar to a serial-to-parallel shift register.

The intermediate outputs of delay element 30 couple to inputs of selective inversion element 32. Each of cells a through n in selective inversion element 32 contains a single selective inverter 42. Thus, selective inversion element 32 contains selective inverters 42a through 42n, and each of selective inverters 42a through 42n is identical to the other ones of selective inverters 42a through 42n. A single selective inverter 42 receives a 4-bit data input and provides a 5-bit data output. The 5-bit data output provides digital values corresponding to digital values presented in the 4-bit data input. The additional bit in the output accommodates carries from an inversion operation.

Selective inverter 42 operates under the control of two bits of data supplied directly from the SI input to convolving element 20 and an additional two bits of data provided from the corresponding cell of inversion control element 34. The 2 bits of data from the SI input couple to inputs SI0 and SI1 of each of selective inverters 42a through 42n. SI0 and SI1 define the significance of the 4-bits being processed by convolving element 20 relative to the overall data sample. For example, a convolving element 20 may process the LSB, MSB, an ISN which contains neither the LSB nor the MSB, or a nibble which contains both the LSB and the MSB.

Inversion control element 34 operates like a shift register. Thus, each cell of inversion control element 34 contains a single latch 44. A latch 44a has a 2-bit input which couples to the CI input of convolving element 20. A 2-bit output of latch 44a couples to a 2-bit input of a latch 44b, and so on until a 2-bit output of latch 44n couples to the CO output of convolving element 20. Clock inputs for each of latches 44 couple to a CK1 clock input of convolving element 20. Each cell of inversion control element 34 provides a 2-bit code from the output of each latch 44 to a selective inverter 42 of the same cell. This 2-bit code controls the action that the particular selective inverter 42 takes with respect to data input to that selective inverter 42. In the preferred embodiment, a selective inverter 42 may take any one of three actions. Selective inverter 42 may either pass the data without inversion, invert the data using either a binary one's complement or a two's complement negation, or force the outputs from selective inverter 42 to equal a logical zero value. Hence, the 2-bit code defines one of three possible actions taken by a selective inverter 42.

The outputs from selective inverters 42a through 42n each couple to adder inputs of summing element 36. Summing element 36 includes a single adder 46. Adder 46 has "n" 5-bit inputs in addition to a 12-bit input supplied at the AI input of convolving element 20. Adder 46 represents a conventional summing tree known to those skilled in the art. This summing tree outputs a 12-bit digital number representing the sum of all inputs to adder 46. This 12-bit output couples to the AO output of convolving element 20.

The preferred embodiment of the present invention contemplates coupling no more than eight convolving elements 20 in a cascaded arrangement without the use of external circuitry. This represents a convolution of 128 samples. Each of the samples becomes a 5-bit number in selective inverter 42. This 5-bit number is supplied to adder 46. Thus, a maximum sum value of 3,968 may be theoretically possible. Hence, 12 adder output bits, which can unambiguously describe any digital number up to a value of 4,095, are used to couple adder 46 to AI inputs and AO outputs of convolving element 20.

Figure 3:
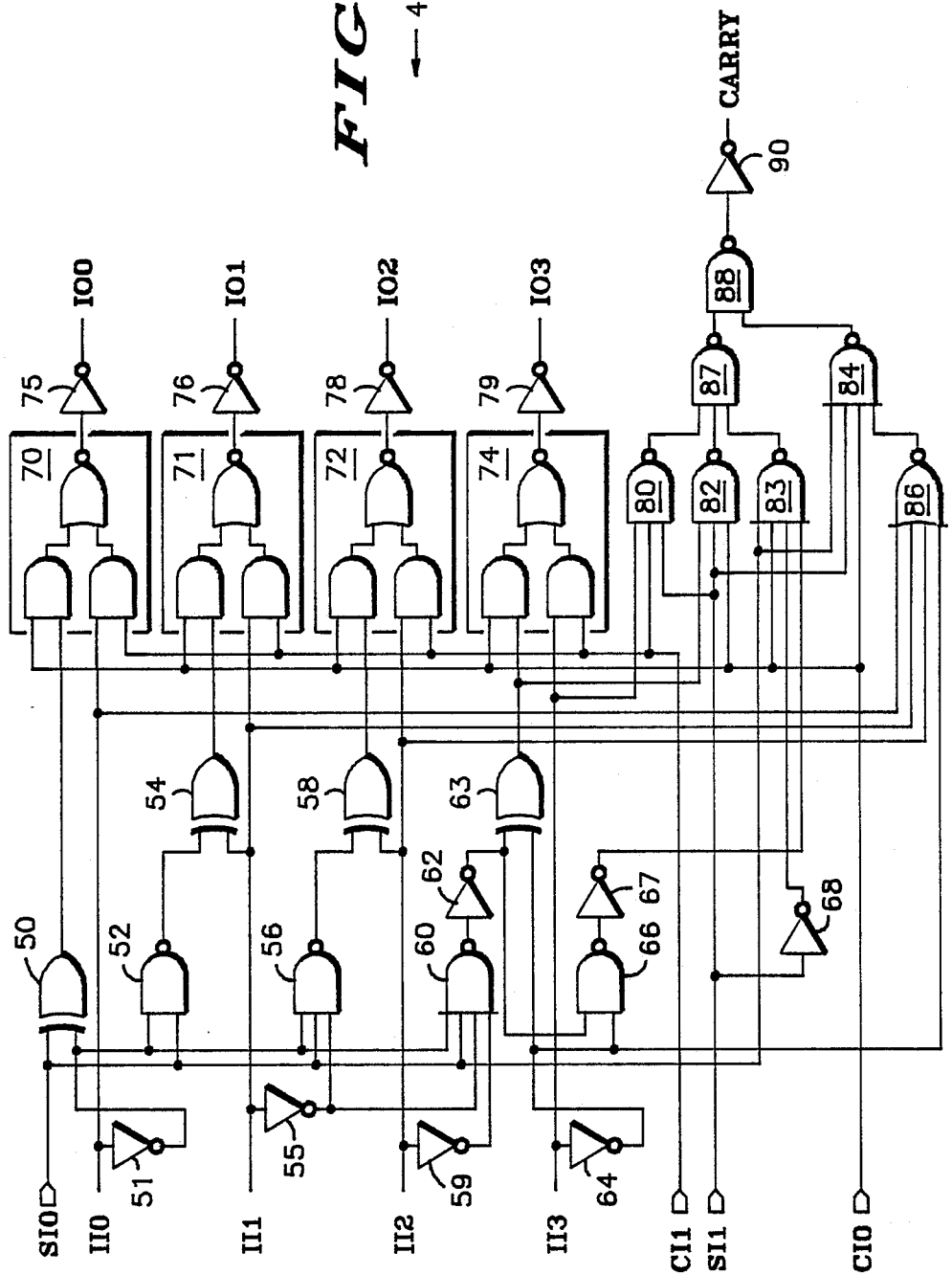
FIG. 3 shows a single selective inverter utilized in a selective inversion element from the FIG. 2 block diagram.

FIGS. 3 and 4 describe the operation of a single selective inverter 42 in more detail. FIG. 3 shows a preferred embodiment of a single selective inverter 42. The SI0 input to selective inverter 42 couples to a first input of an Exclusive OR gate 50. The least significant bit of the input data (II0) to selective inverter 42 couples to an input of an inverter 51, a first, second channel input of a 2-channel wide, 2-input AND-OR-Invert (AOI) gate 70 and a first input of a 4-input NOR gate 86. An output of inverter 51 couples to a second input of Exclusive OR gate 50, a first input of a 2-input NAND gate 52, a first input of a 3-input NAND gate 56, and a first input of a 4-input NAND gate 60. The SI0 input to selective inverter 42 additionally couples to a second input of NAND gate 52, a second input of NAND gate 56, a second input of NAND gate 60, a first input of a 4-input NAND gate 83, and a first input of a 4-input NAND gate 84. The next to the least significant bit of input data (II1) to selective inverter 42 couples to an input of an inverter 55, a first input of an Exclusive OR gate 54, a first, second channel input of a 2-input, 2-channel AOI gate 71, and a second input of NOR gate 86. An output of inverter 55 couples to a third input of NAND gate 56, and a third input of NAND gate 60. The next most significant bit of input data (II2) to selective inverter 42 couples to an input of an inverter 59, a first input of an Exclusive OR gate 58, a first, second channel input of a 2-input, 2-channel wide AOI gate 72, and a third input of NOR gate 86. An output of inverter 59 connects to a fourth input of NAND gate 60. The most significant bit of data input (II3) to selective inverter 42 couples to an input of an inverter 64, a first, second channel input of a 2-input, 2-channel wide AOI gate 74, and a first input of a 3-input NAND gate 80. An output of inverter 64 connects to a first input of an Exclusive OR gate 63, a first of a 2-input NAND gate 66, and a fourth input of NOR gate 86.

An output of Exclusive OR gate 50 connects to a second, second channel input of AOI gate 70, an output of Exclusive OR gate 54 connects to a second, second channel input of AOI gate 71, an output of Exclusive OR gate 58 connects to a second, second channel input of AOI gate 72. An output of Exclusive OR gate 63 connects to a second, second channel input of AOI gate 74 and to a first input of a 3-input NAND gate 82. An output of NAND gate 52 connects to a second input of Exclusive OR gate 54, an output of NAND gate 56 connects to a second input of Exclusive OR gate 58, and an output of NAND gate 60 connects to an input of an inverter 62. An output of inverter 62 connects to a second input of exclusive OR gate 63 and to a second input of NAND gate 66. An output of NAND gate 66 connects to an input of an inverter 67, and an output of inverter 67 connects to a second input of NAND gate 83.

Significance input SI1 of selective inverter 42 couples to an input of an inverter 68, a second input of NAND gate 82, a second input of NAND gate 80, and a second input of NAND gate 84. An output of inverter 68 connects to a third input of NAND gate 83. Control input CI0 of selective inverter 42 couples to a third input of NAND gate 84, a fourth input of NAND gate 83, a third input of NAND gate 82 and a second first channel input of each of AOI gates 70, 71, 72 and 74. Control input CI1 of selective inverter 42 couples to a third input NAND gate 80 and second, first channel inputs to each of AOI gates 70, 71, 72 and 74.

An output of AOI gate 70 connects to an input of an inverter 75, an output of AOI gate 71 connects to an input of an inverter 76, an output of AOI gate 72 connects to an input of an inverter 78, and an output of AOI gate 74 connects to an input of an inverter 79. An output of inverter 75 connects to output data bit IO0, which represents the least significant bit of data output from selective inverter 42. An output from inverter 76 connects to output data bit IO1, and an output of inverter 78 connects to output data bit IO2. An output of inverter 79 connects to output data bit IO3, which represents the most significant bit of data output from selective inverter 42, with the exception of a carry bit which is discussed below.

An output of NAND gate 80 connects to a first input of a 3-input NAND gate 87. Likewise, an output of NAND gate 82 connects to a second input of NAND gate 87, and an output of NAND gate 83 connects to a third input of NAND gate 87. An output of NAND gate 87 connects to a first input of a 2-input NAND gate 88, and an output of NAND gate 84 connects a second input of NAND gate 88. An output of NAND gate 88 connects to an input of an inverter 90, and an output of inverter 90 connects to the carry output from selective inverter 42.

Thus, II0 through II3 represent the input data bits to selective inverter 42 while IO0 through IO3 and carry represent the data output bits from selective inverter 42. IO0 through IO3 correspond to II0 through II3 in significance. However, the carry bit represents an additional output data bit from selective inverter 42.

FIG. 4 shows a table which describes the operation of a selective inverter 42. Referring to FIG. 4, each selective inverter 42 operates in seven distinct states labeled State 91 through State 97. The particular state is controlled by the code presented on the CI0, CI1, SI0, and SI1 inputs to selective inverter 42.

In the state labeled State 91 in FIG. 4, a selective inverter 42 receives a code of logical 00 in the control inputs CI0 and CI1. Referring to FIG. 2, these bits are input from a corresponding cell of inversion control element 34. In State 91, all outputs IO0 through IO3 and carry are forced to exhibit a logical zero value regardless of the values presented on significance inputs SI0 and SI1 because AOI gates 70, 71, 72 and 74 and NAND gates 80, 82, 83 and 84 all become disabled. This state may be particularly useful when a system wishes not to perform a convolution of as many samples as a convolving circuit 10 (see FIG. 1) may accommodate. This state may be particularly useful in radar applications where a radar may change the pulse width of the transmitted pulse in an attempt to detect an object near the radar antenna. Additionally, this state permits convolution over any number of samples rather than a number of samples which are an integral multiple of "n" as described above in connection with FIG. 2.

States 92 and 93 together represent states in which data are passed through a selective inverter 42 without being inverted. In each of States 92 and 93 the control input data provided on inputs CI0 and CI1 exhibit a logical zero and a logical one, respectively. In State 92, the significance input SI1, which describes whether convolving element 20 is processing a most significant bit of an input data sample, is a 0 to indicate that convolving element 20 is not processing a most significant bit. Conversely, in State 93, SI1 indicates that convolving element 20 is processing a most significant bit of an input data sample. In both of States 92 and 93 outputs IO0 through IO3 equal corresponding inputs IO0 through IO3. However, in State 92, the carry bit is forced to a 0 while in State 93 the carry bit is forced to equal an extension of input data bit II3. The forcing of the carry bit to equal input data bit II3 occurs in part through the enabling of NAND gate 80. This represents a sign extension operation known to those skilled in the art. It maintains the polarity of a 4-bit number when represented as a 5-bit number in conventional two's complement binary arithmetic.

States 94, 95, 96 and 97 together represent the inversion states. Since the present invention may operate with binary phase coded data, the phase of received signals which are represented in the input data stream samples exhibit either in-phase or 180° out-of-phase relationships with other samples. To convert aligned out-of-phase samples so that all outputs from selective inversion element 32 (see FIG. 2) describe a signal exhibiting a common or compensated phase, an arithmetic negation rather than a simple binary one's complement of particular samples must occur. However, a negation represents a arithmetic operation in which a carry bit may ripple from a least significant bit to a most significant of an input data sample. Since convolving element 20 (see FIG. 2) may process only a portion of the entire input data sample, the present invention manipulates the carry bit depending upon the code described in significance inputs SI0 and SI1 to refrain from using an excessive number of terminals for interconnections between various convolving elements 20.

More specifically, in each of States 94 through 97 the control input code presented to selective inverter 42 on bits CI0 and CI1 represents a logical one and a logical zero, respectively. In State 94, the significance inputs presented in SI0 and SI1 represent a logical zero and a logical zero, respectively. This defines a state wherein convolving element 20 processes neither the most significant bit nor the least significant bit of an entire input data sample. In this state, the carry bit is forced to a logical zero value by disabling NAND gates 80, 82, 83 and 84 while the output presented to output data bits IO0 through IO3 represents the binary one's complement of the data input at bits II0 through II3, respectively. No carry into and no carry out from a convolving element 20 occurs.

In State 95, significance inputs SI0 and SI1 exhibit a logical zero and a logical one, respectively. This defines a state wherein convolving element 20 processes the MSB of an entire input data sample but does not process an LSB of the entire input data sample. In this situation, the output provided at output data bits IO0 through IO3 represents the binary one's complement of the input data provided at II0 through II3, and the carry bit represents a sign extension of the bit provided at output IO3. In other words, the carry bit represents a complement of the input provided at II3.

In State 96, the significance inputs SI0 and SI1 exhibit a logical one and a logical zero, respectively. This state indicates the situation where convolving element 20 processes only the least significant bit of an entire input data sample and does not process the most significant bit. In State 96 the output provided at output data bits IO0 through IO3 represents an arithmetic negation of the input data provided at II0 through II3. In two's complement arithmetic, a negation is equivalent to an addition of one to a binary one's complement of the data. This addition of one creates a situation where an arithmetic carry may occur. Thus, the carry output bit represents the arithmetic carry from the negation operation through the operation of NAND gate 83, which is enabled only during State 96. For the 4-bit data sample shown in the preferred embodiment, this carry can occur only when a value of 0000 is input. In this case the resulting output would be a 1 in the carry bit and a 0000 in bits IO0 through IO3.

In State 97 significance inputs SI0 and SI1 exhibit a logical one and a logical one, respectively. This signifies that convolving element 20 processes both the most significant and the least significant bit of the entire input data samples. In State 97, outputs IO0 through IO3 represent the negation of inputs II0 through II3, and the carry bit typically represents a sign extension of the data output on bit IO3. However, NOR gate 86 in FIG. 3 decodes a special condition which occurs when the value 1000 is input at data inputs II3 through II0, respectively. This code represents a −8 in conventional two's complement arithmetic. The result of an inversion of −8 is +8, which is 01000 in binary. Thus, in this special situation, the carry bit is forced to a zero to provide the fifth bit.

In summary, convolving element 20 may be used in a wide variety of applications. The expandability of convolving element 20 permits a wide range of bits per sample to be processed and a wide range in the number of samples convolved. Either a single element convolving circuit or multiple element convolving circuit may be permitted using a single convolving element design. Additionally, interconnections are minimized between convolving elements 20. For example, no interconnections are required between elements to let the carries propagate directly from a least significant bit to a most significant bit for each sample involved in the convolution process. Rather, the carries are accumulated through cascaded connections and resolved in an addition operation which occurs in adder 18 (as shown in FIG. 1).

The foregoing description uses a preferred embodiment to illustrate the present invention. However, those skilled in the art will recognize that many changes and modifications may be made to this embodiment without departing from the scope of the present invention. For example, convolving element 20 need not over sample the input data stream as shown in FIG. 2 by the inclusion of two latches per cell in delay element 30. Alternatively, delay element 30 could include only one latch per cell or could utilize multiplexers on the input of every other latch to select whether an over sampled or normal rate input should be routed to these latches. A different number of cells may be included in convolving element 20 than the 16 cells used by the preferred embodiment. Additionally, the terms logical zero and logical one used herein have meaning only in relation to each other. The particular polarities which may be selected for implementation of such logical values may vary. Furthermore, the particular coding scheme illustrated herein may easily be varied by those skilled in the art to suit a particular application. Moreover, the entire selective inversion element 42 which is described in FIG. 3 may be implemented to accomplish the functions described in FIG. 4 using PROM or other logical arrangements than those described in FIG. 3. These and other modifications which are obvious to those skilled in the art are intended to be included within the scope of this invention.

We claim:

1. An expandable bi-phase convolving element for processing at least a portion of a stream of input data samples, said convolving element comprising:
   delay element means having a circuit input for receiving in parallel a first predetermined number of bits from the stream of input data samples and having a second predetermined number of intermediate outputs each of which supply the first predetermined number of bits;
   selectively inverting means, having the second predetermined number of data inputs, each of which receive the first predetermined number of bits from the stream of input data samples from one of the intermediate outputs of the delay element means and having the second predetermined number of outputs, each of which supply an output carry bit in addition to the first predetermined number of output data bits, for selectively inverting the bits from the stream of input data samples;
   control input signal means for indicating a plurality of control states;
   said selectively inverting means being connected to said control input signal means, said selectively inverting means operating in response to a first control state to extend a value exhibited by a most significant one of said selectively inverting means output data bits into the output carry bit for each of the inverting means outputs;
   means for enabling said extending only when the first predetermined number of bits from the stream of input data samples include a most significant bit of the input data samples, said means for enabling being connected to said control input signal means; and
   adder means having the second predetermined number of adder inputs, each of which couples to a respective one of the outputs of said selectively inverting means, said adder means providing a convolved output data stream.

2. A convolving element as claimed in claim 1, said selectively inverting means further operating to force individual ones of the inverting means outputs to exhibit a logical zero value in response to a second control state.

3. A convolving element as claimed in claim 1, said selectively inverting means further operating to force the output carry bit for each of said selectively inverting means outputs to exhibit a logical zero value in response to a third control state.

4. A convolving element as claimed in claim 3, said means for selectively inverting additionally comprising means for operating said forcing means when the first predetermined number of bits from the stream of input data samples include neither a most nor a least significant bit of the input data samples, said means for operating being connected to said control input signal means.

5. A convolving element as claimed in claim 1, said selectively inverting means further operating to negate a value presented in the first predetermined number of bits from the stream of input data samples in response to a fourth control state.

6. A convolving element as claimed in claim 5, said means for selectively inverting additionally comprising means for allowing the output carry bit of the inverting means outputs to exhibit a value representing an arithmetic carry from a negation of a value presented in the first predetermined number of bits from the stream of input data samples, said means for allowing being connected to said control input signal means.

7. A convolving element as claimed in claim 6, said means for selectively inverting additionally comprising means for enabling said allowing means only when the first predetermined number of bits from the stream of input data samples include a least significant bit and not a most significant bit of the input data samples, said means for enabling being connected to said means for allowing and to said control input signal means.

8. A method of convolving at least a portion of a stream of input data samples, said method comprising the steps of:
   delaying the input data samples by a first predetermined number of different delays to supply the first predetermined number of delayed signals;
   selectively inverting the delayed signals to provide selectively inverted samples so that arithmetic carries generated in a negation of a portion of the delayed signals are included in the selectively inverted samples;
   forcing individual ones of the selectively inverted samples to exhibit a logical zero value;
   said selectively inverted samples represent digital numbers each of which have a most significant bit and a carry bit;
   extending a value exhibited by the most significant bit into the carry bit for each of the selectively inverted samples; and
   adding the selectively inverted samples together to produce a convolved output data stream.

9. A method as claimed in claim 8, said method of convolving additionally comprising the step of forcing the carry bit for each of the inverting means outputs to exhibit a logical zero value.

10. A method as claimed in claim 9, said method of convolving additionally comprising the step of negating the delayed signals.

* * * * *